UNITED STATES PATENT OFFICE.

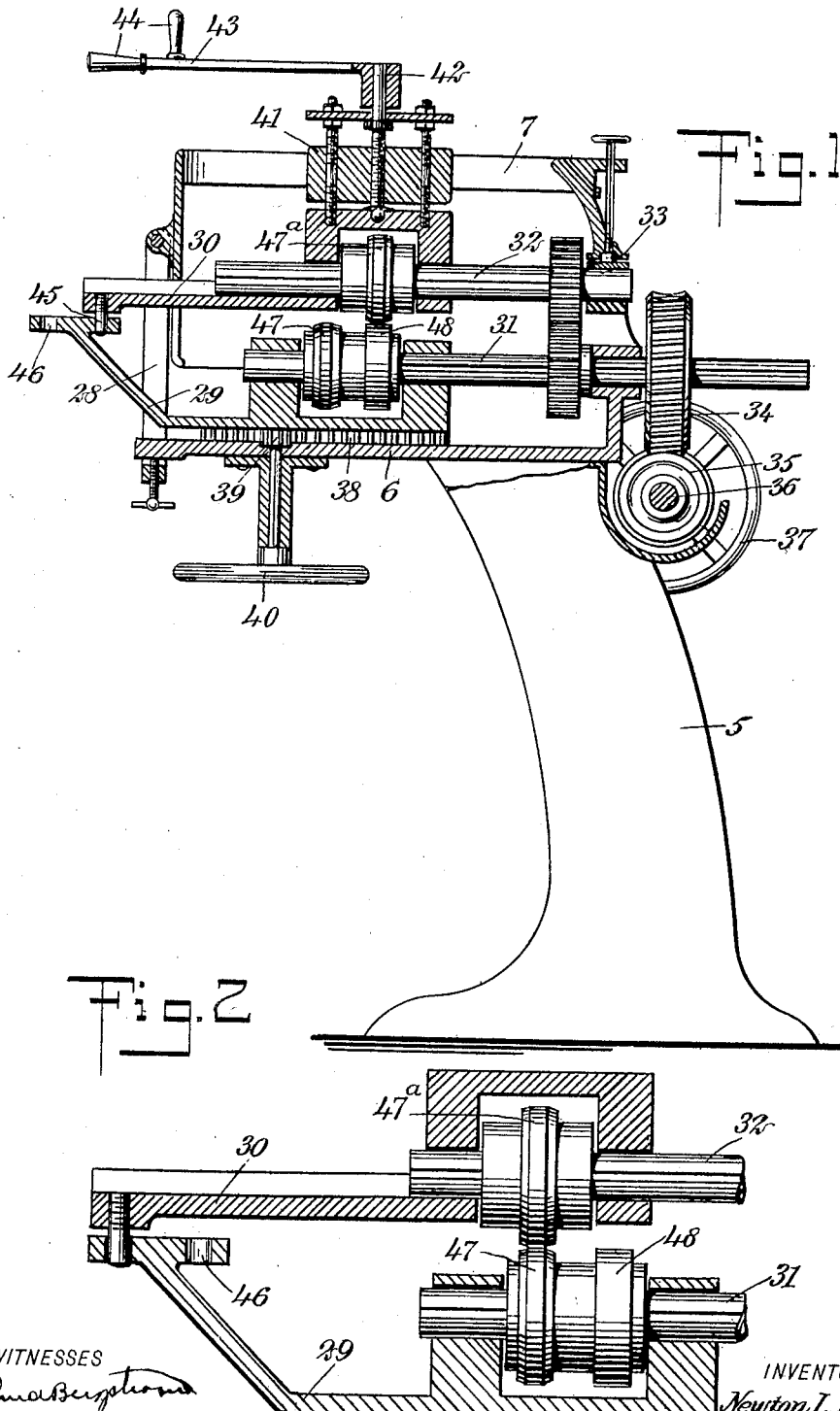

NEWTON L. BOTTEN, OF OPELOUSAS, LOUISIANA.

SAW LEVELING AND STRETCHING MACHINE.

No. 913,463.  Specification of Letters Patent.  Patented Feb. 23, 1909.

Application filed February 29, 1908. Serial No. 418,412.

*To all whom it may concern:*

Be it known that I, NEWTON L. BOTTEN, a citizen of the United States, and a resident of Opelousas, in the parish of St. Landry and State of Louisiana, have invented a new and Improved Saw Leveling and Stretching Machine, of which the following is a full, clear, and exact description.

This invention is an improvement in machines for removing lumps, kinks, ridges, etc. in saws, commonly known as "leveling", preparatory to stretching the saw in adjusting its "tensions", which is secured in machines as now generally used by passing the saw longitudinally between rollers of equal width and thereby stretching the saw equally on both surfaces. All band saws when in operation develop inequalities on one or the other of their faces, that must be removed or equalized before the saw can be rolled for "tension", and the common practice has been to do this by means of repeated blows of a hammer, the saw resting on a flat metal surface; the effect of such a blow being to flatten or contract the upper surface receiving the blow and to expand or stretch the lower surface next to the anvil.

I have discovered that when a saw is passed between two rollers having working faces of unequal width the surface or face of the saw next to the wide roller is expanded, and that the pressure of the narrow roller acts in the same manner as the blow of the hammer in reducing the lump, ridge, etc., a result that cannot be obtained by any machine at the present time in use so far as I am aware, and it is the purpose of this invention to provide such a machine, which is not only capable of performing the leveling operation, but also that of stretching the saw whereby the saw may be placed in perfect order by the use of one apparatus.

Reference is to be had to the accompanying drawings forming a part of this specification, in which similar characters of reference indicate corresponding parts in both the views.

Figure 1 is a central vertical section through a machine embodying my invention; and Fig. 2 is a fragmentary like section on an enlarged scale, showing the rollers in a relatively different position.

I preferably apply my improvements to a saw stretching machine of the type disclosed in Letters Patent Number 548,394, granted to Elisha B. Rich, October 22, 1895; this machine comprising a supporting frame or pedestal 5 having a laterally-projecting frame 6 rigid with its upper end, a frame 7 pivoted at its rear end over the frame 6 and adapted to be rigidly secured thereto by a strap 28, and a frame slidable between the fixed or rigid frame and the pivoted frame, comprising a lower and upper section 29 and 30, respectively, detachably connected at their forward ends. In the fixed frame 6 and the lower section 29 of the slidable frame is journaled a horizontally-disposed shaft 31 running from front to the rear and directly geared with a shaft 32, likewise disposed above it and journaled in the upper section 30 of the slidable frame and in a vertically-adjustable bearing 33 carried by the pivoted frame 7. On the rearwardly-projecting end of the lower shaft 31 is splined a worm wheel 34, meshing with a worm 35 on a driving shaft 36 provided with the driving pulleys 37.

The lower section 29 of the slidable frame is provided with a rack 38, with which meshes a pinion 39 in fixed relation to an operating wheel 40 by which both sections of the slidable frame move back and forth. In this movement of the frame the lower shaft 31 is moved back and forth therewith, and the upper shaft 32 remains stationary in so far as axial movement is concerned. The upper section 30 of the slidable frame is constructed with a cross-head or guide-block 41, movable between guides on the pivoted frame 7. Through this block is threaded a screw 42 having an operating lever 43 provided with a suitable handle 44 for both turning the screw and moving the sliding frame back and forth.

The construction so far described is old in the patent above referred to. My improvements, however, consist in making the lower and upper sections of the slidable frame not only detachable but also relatively adjustable, which I preferably do by providing the upper section 30 of this frame with a stud 45, adapted to engage in either one of two spaced openings 46 formed in a laterally-projecting member of the bottom section 29. Between the bearings of each section of the slidable frame, instead of providing only two coacting rollers having working faces of equal width, I place on the lower shaft 31, between the bearings of the lower section 29 of the slidable frame, two rollers 47 and 48 respectively, and on the upper shaft 32, between the bearings of the upper section of the slidable frame, a roller 47ª, in all respects the same as the roller 47, which, as shown, are each beveled off at opposite edges presenting narrow slightly convex or crowned working faces, whereas the roller 48 is materially wider, ordinarily about twice the width of the working face of either the rollers 47 or 47ª.

In the operation of the machine, the two sections of the slidable frame are connected together, as illustrated in Fig. 1, which brings the rollers 48 and 47ª in direct opposition. The saw is then placed between these rollers so that the lumps or other elevations will be on its upper face where they may be subjected directly to the pressure of the narrow roller which operates to spread or thin the metal on that side of the saw only, and by repeatedly passing the saw under this roller to cause the lump or ridge to entirely disappear; the roller 48 during this process serving as an anvil only. When the leveling of the saw is completed, the two sections of the slidable frame are connected, as shown in Fig. 2, which brings the two narrow rollers into coacting relation, adapting the machine to be used in the ordinary manner in stretching the saw to bring it to the proper tension, thus placing the saw in perfect condition as regards leveling and tensioning, with one apparatus.

Having thus described my invention, I claim as new and desire to secure by Letters Patent:

1. In a saw rolling machine, the combination of a stretching roller, an anvil roller, a second stretching roller, and means adapting the second stretching roller to be moved into opposition with either the anvil roller or the first mentioned stretching roller.

2. In a saw rolling machine, the combination of a frame made in two sections, a stretching roller, and an anvil roller carried by one of the frame sections, a second stretching roller carried by the other frame section, and means adapting the frame sections to be shifted relatively to each other to bring the second stretching roller into opposition with either the anvil roller or the first mentioned stretching roller.

In testimony whereof I have signed my name to this specification in the presence of two subscribing witnesses.

NEWTON L. BOTTEN.

Witnesses:
  B. R. MYERS,
  P. H. EASTHAM.